United States Patent [19]
Bauchot et al.

[11] Patent Number: 5,442,659
[45] Date of Patent: Aug. 15, 1995

[54] RADIO COMMUNICATIONS SYSTEM WITH FAULT TOLERANT FREQUENCY HOPPING SYNCHRONIZATION

[75] Inventors: Frederick J. Bauchot, Saint-Jeannet, France; Chia-Chi Huang, Hsinchu, Taiwan; Ilan Kessler, Bronx; Kadathur S. Natarajan, Millwood, both of N.Y.

[73] Assignee: International Business Machines Corporation, Armonk, N.Y.

[21] Appl. No.: 142,555

[22] Filed: Oct. 22, 1993

[51] Int. Cl.[6] ............................................. H04B 1/713
[52] U.S. Cl. .................................... 375/202; 375/200; 380/34; 380/48
[58] Field of Search ......................... 375/1; 380/34, 48

[56] References Cited
U.S. PATENT DOCUMENTS

| | | | |
|---|---|---|---|
| 4,612,652 | 9/1986 | Kadin | 375/1 |
| 4,850,036 | 7/1989 | Smith | 455/51.1 |
| 5,079,768 | 1/1992 | Flammer | 370/94.1 |
| 5,081,641 | 1/1992 | Kotzin et al. | 375/1 |
| 5,121,408 | 6/1992 | Cai et al. | 375/1 |
| 5,123,029 | 6/1992 | Bantz et al. | 375/1 |
| 5,130,987 | 7/1992 | Flammer | 370/103 |

*Primary Examiner*—Bernarr E. Gregory
*Attorney, Agent, or Firm*—Perman & Green

[57] ABSTRACT

A method for use in multicellular communication network system of the type having base stations and a plurality of remote stations. The method achieves reliable and fault tolerant synchronization between the stations in a call when a frequency hopping technique is used. The method includes steps for acquiring the frequency hop sequence by remote station and tracking the frequency hop sequence after acquisition in order to stay in synchronism. The method also provides for recovering from loss of synchronism and for staying in synchronism.

6 Claims, 5 Drawing Sheets

DTP DATA TRANSFER PHASE
AH1, AH2 CONTAIN FREQUENCIES F(1), F(2)
AH3, AH4 CONTAIN FREQUENCIES F(2), F(3)

RADIO COMMUNICATIONS SYSTEM WITH FAULT TOLERANT FREQUENCY HOPPING SYNCHRONIZATION

FIELD OF THE INVENTION

The present invention relates to communication systems, and more particularly to synchronization of frequency hopping communication systems which are fault-tolerant in the presence of transmission errors.

BACKGROUND OF THE INVENTION

Frequency hopping is a radio communication technique in spread-spectrum modulation wherein information is transmitted using a sequence of carrier frequencies that change at set times to produce a narrow band signal that bounces or hops around in center frequency over the available spectrum.

In a centrally controlled multicellular mobile radio communication system based on slow frequency hopping, each cell has a base station that provides the necessary timing and control information received and used by all the remote stations that belong to the cell.

All stations belonging to a cell, the base station and all remote stations that belong to it, must hop in synchronism in order to communicate with each other at the same frequency. Different cells will typically operate on different frequency hopping patterns, The control information required for synchronized frequency hopping is broadcast by the base station. A key problem in the operation of a frequency-hopping based system is that of maintaining hop synchronization between all stations that belong to the same cell. Synchronization must be ensured even under conditions of loss of transmission of control information. The problem of maintaining synchronism can be further divided into the subproblems of: a) Obtaining initial synchronism, b) Staying in synchronism and c) Reacquisition of synchronism after temporary loss of synchronism. The base station may modify at any time the frequency hopping pattern (for instance to overcome interferences) and the remote stations must be able to follow this pattern change in an efficient and reliable manner.

The following references are typical of the background art in the field of frequency hopping systems and synchronization techniques therefor.

In U.S. Pat. No. 5,130,987 issued Jul. 14, 1992 to Flammer entitled "Method For Synchronizing A Wide Area Network Without Global Synchronizing", a frequency-hopping packet communication system without a master clock or master control unit is described which is based on use of a receiver's frequency hopping timing and identification to control communication. A frequency-hopping band plan, involving the number of channels and the pseudo-random pattern of change and nominal timing of changes, is universally known to each node in the network. A transmitter acquires synchronization with a target node by use of information previously received from or about a target indicating timing of present idle frequency hop of the target receiver. Each receiving node establishes in each station or node a table of receiver frequency hopping sequence offsets (hop timing offsets) of each other node within its communication range, and each node announces its communication range, and each node announces its presence on each frequency in a packet with a hop timing offset indicator. The hop timing offset indicator is a key used to read a table to allow nodes to set themselves in synchronization with one another. A location indicator built into the address of each packet is used to randomize an ordered frequency-hopping table at each node.

Frequency-hopping is implemented by the division of communication slots and the accumulation of slots into epochs, wherein each epoch equals the total number of available slots (number of channels times the number of time frames per channel). The transmitting node tracks the pre-established frequency-hopping pattern for its target receiver based on previously-acquired information.

U.S. Pat. No. 5,121,408 issued Jun. 9, 1992 to Cai et al. entitled "Synchronization For Entry To A Network In A Frequency Hopping Communication System" discloses techniques for synchronization of a frequency hopping transceiver to a network by embedding synchronization codes in the pseudo-random frequency hopping transmission sequence. A receiver is implemented with a frequency detector and a correlator to generate a correlator signal in response to the synchronization codes in the pseudo-random frequency detector and a correlator to generate a correlator signal in response the synchronization codes in the pseudo-random frequency hopping transmission sequence. Detection of a peak in the correlator signal is indicative of synchronization of the receiver with the network. The network entry synchronization scheme is such that, when two transceivers A and B are communicating, a third unnetworked transceiver C extracts the hidden network entry code pattern from the A-B transmission in order to enter the network. As a part of the communication between the two transceivers A and B, transceiver A transmits a known pattern as a hidden part of the communication which allows transceiver C to enter the A-B network. This hidden code pattern permits rapid synchronization and correction of large initial time errors, and permits correction of time drift from then on.

U.S. Pat. No. 5,081,641 issued Jan. 14, 1992 to Kotzin et al. entitled "Interconnecting And Processing System For Facilitating Frequency Hopping" discloses a method and apparatus for facilitating communication of information in a system without the use of a baseband hopping unit, by sharing a common TDM bus between a plurality of radio communication units, processing units, and information links, where the processing units extract traffic channel information, packetize and/or unpacketize the information, and return same back to the common bus for retrieval by the information links or radio communication units.

U.S. Pat. No. 5,079,768 issued Jan. 7, 1992 to Flammer entitled "Method For Frequency Sharing In Frequency Hopping Communications Network" discloses a frequency hopping communications system wherein frequency-hopping is implemented by the division of communication slots and the accumulation of slots into epochs, wherein each epoch equals the total number of available slots (number of channels times the number of time frames per channel). A transmitting node tracks the preestablished frequency-hopping pattern for its target receiver based on previously-acquired information. The transmission node identifies a receiver node. The transmission node then checks the frequency channel to determine if available (e.g., not in use and within an acceptable noise margin). If unavailable, the transmission node delays transmission to the identified node to a later slot. During the delay, the transmission node identifies another receiver node and a corresponding current frequency channel. The steps of identifying a receiver node and checking the corresponding current frequency channel are repeated until a node having an available frequency channel is identified. The transmission node then sends a packet to the selected receiver node at a frequency and for a duration defined according to the current slot. Such transmission node tracks the changing frequency of the selected receiver node to maintain frequency synchronization.

In U.S. Pat. No. 4,850,036 issued Jul. 18, 1989 to Smith entitled "Radio Communication System Using Synchronous Frequency Hopping Transmissions" a frequency-hopping radio communication system is disclosed comprising a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmission are synchronized to the control unit transmissions, thereby preventing any two stations from concurrently using the same frequencies for either transmitting to or receiving from the control unit.

In U.S. Pat. No. 4,612,652 issued Sep. 16, 1986 to Kadin entitled "Frequency Hopping Data Communication System" an improved frequency hopping data communication system with a random transmission bandwidth to provide independent frequency hopping of the mark and space frequency is provided in the system which is particularly immune to repeater jamming. Only one frequency is transmitted at a time upon selection on a bit instant by a pseudo-noise code generator. The location of the mark and space frequency is randomly chosen, however, the location is known at the transmitter and the repeater by appropriate synchronization equipment.

SUMMARY OF THE INVENTION

In accordance with the present invention, methods and structure are provided for achieving reliable and fault tolerant synchronization between the stations within a radio communication cell in the presence of errors.

The present invention enables a remote stations to acquire an initial hop pattern after a station is powered on and to track the hopping patterns after it is initially acquired in order to stay in synchronism as long as it is powered on and the base station is operable. The present invention also provides for the recovery of a station from loss of synchronism that may be caused by transient propagation conditions.

DESCRIPTION OF THE PREFERRED EMBODIMENT

Figure 1:
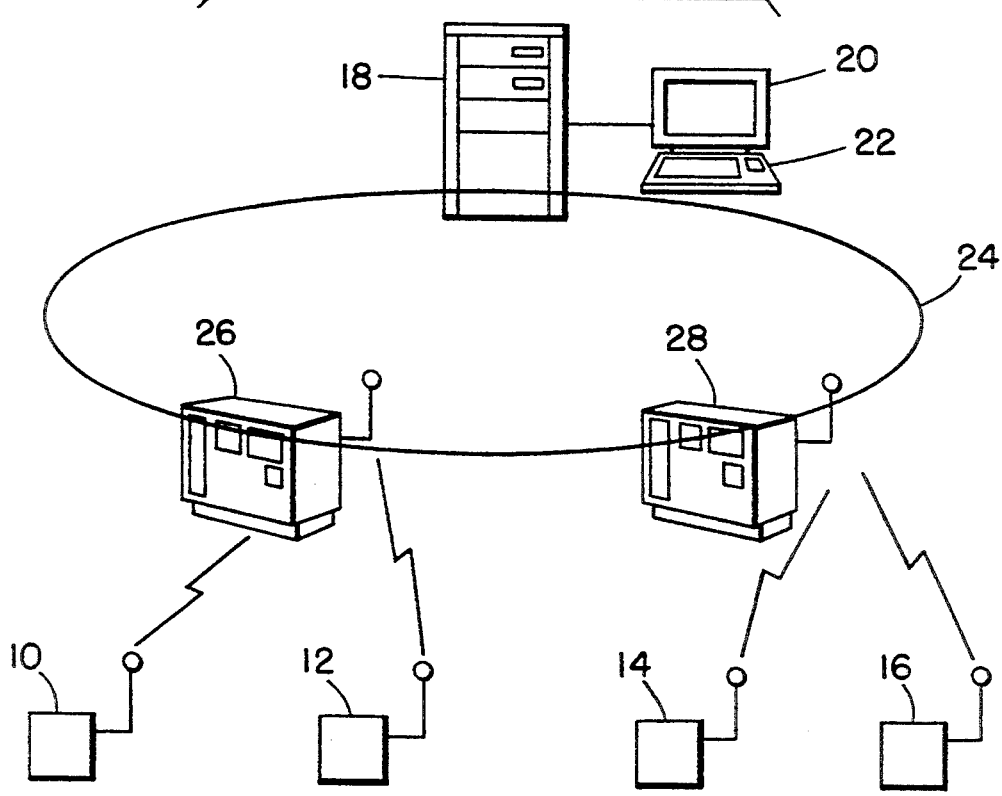
FIG. 1 is a pictorial diagram showing a typical radio digital data communication system of the type in which the invention is implemented.
Figure 1A:
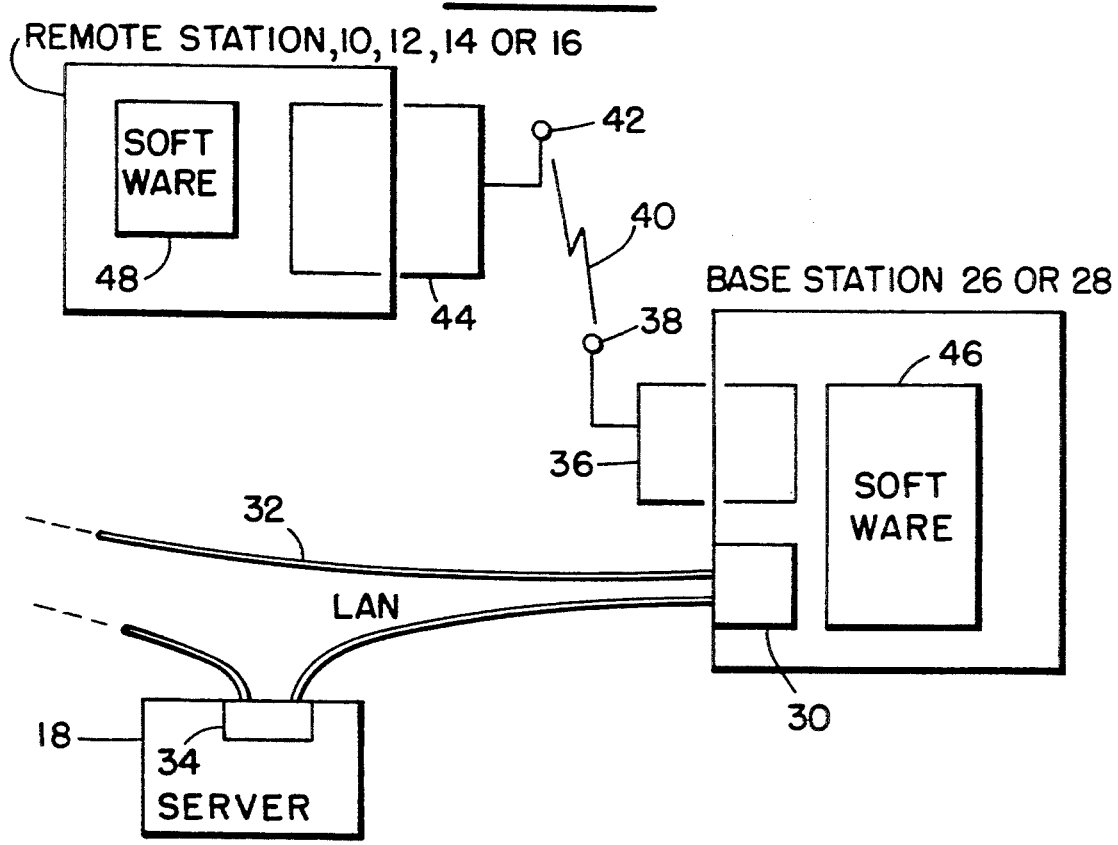
FIG. 1A is a block diagram of the system shown in FIG. 1 illustrating the basic components of a mobile station and a base station as known in the art.

Referring now to the drawings, and more particularly to FIG. 1, there is shown a typical radio system allowing communication between a plurality of mobile stations 10, 12, 14, and 16 and applications and data residing in a computing system. The computing system typically includes a Wireless Network Manager (WNM) or Wireless Network Controller 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the mobile stations 10, 12, 14, and 16 communicate. These gateways, referred to as base stations, are augmented according to the invention to provide certain radio system management functions which coordinate the mobile stations' access to the common radio channel. Communications between mobile stations is supported via relay through the base stations 26 and 28.

shown in more detail in FIG. 1A, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

Figure 2:
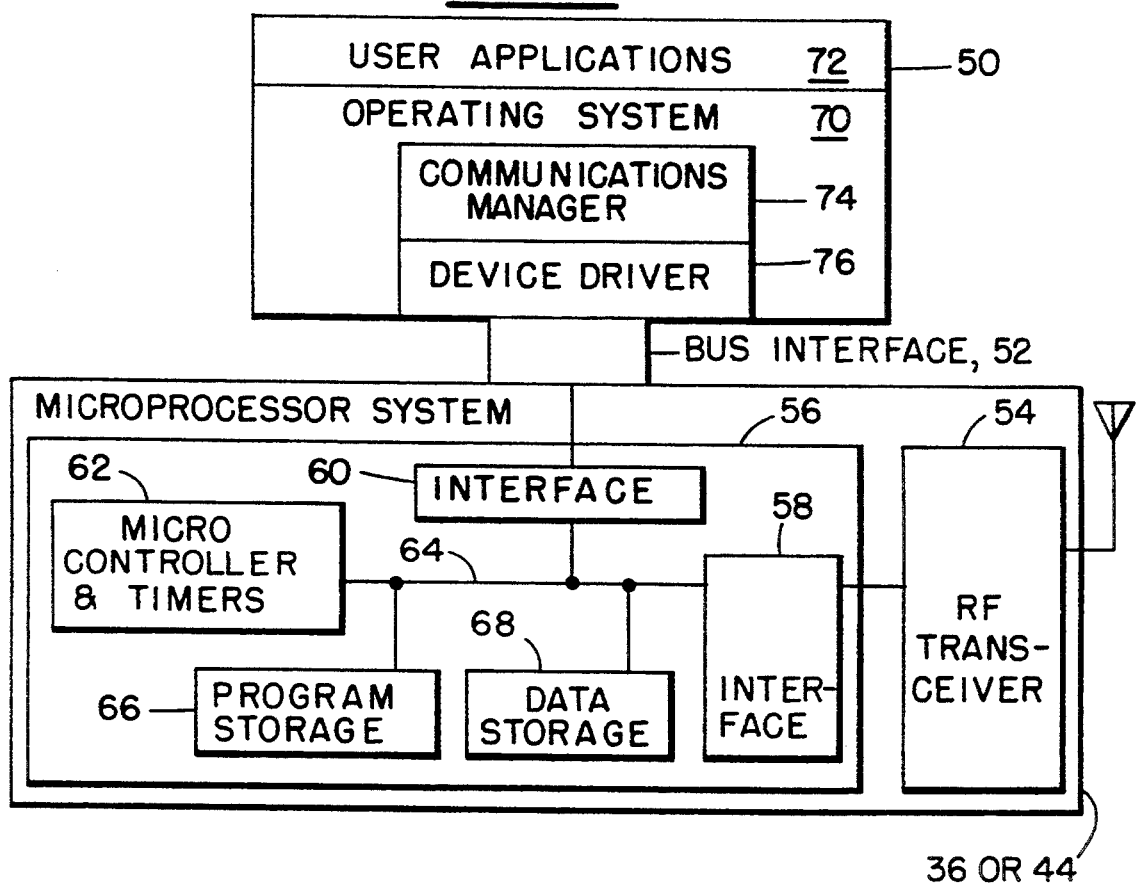
FIG. 2 is a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to the computer 50 via the computers bus interface 52. The transceiver station is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example Mischa Schwartz, *Telecommunication Networks: Protocols, Modeling and Analysis*, Addison-Wesley (1988).

When a packet is received through the RF transceiver 54, the serial channels check the packet destination address, check for errors, and deserialize the packet to data storage 68. The serial channels must have the capability to recognize a specific adapter address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
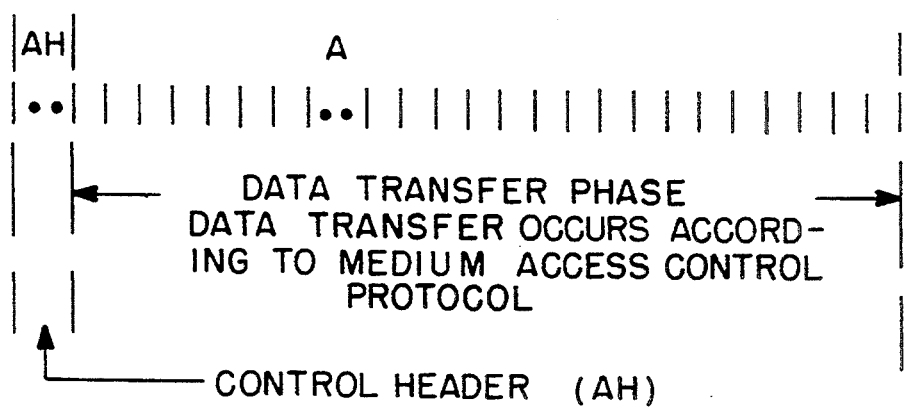
FIG. 3 is a schematic illustration of a time frame of a frequency hop used in a communication system according to the present invention.

Referring to FIG. 3, an illustration showing one time frame of a sequence of frequency hops including a control header AH and a plurality of slots with a data transfer phase A as employed in the present invention.

For the purpose of explanation, the embodiment of the invention will have a hop consisting of exactly one frame.

During the control phase the frame header AH containing control information is broadcast by the base station. The control information within AH includes among other data, the information necessary for stations to perform frequency-hopping and stay in synchronism with respect to each other.

The data transfer phase A includes the outbound data transmitted from the base station to mobile stations, and inbound transfer of data transmitted from the mobile stations to the base station in accordance with a multiple access protocol.

Figure 4:
FIG. 4 is a schematic illustrations of the information included in the header of the time frame shown in FIG. 1.

The aforesaid control information within the AH header necessary for stations to perform frequency hopping is shown in FIG. 4. The addressing information contained in header AH as shown in FIG. 4 includes all pertinent information required to uniquely identify a base station. For example, this could consist of a pair <NETWORKID, BASEID> where NETWORKID is the identification of the network and BASEID is the identification of the base station within the network. TIMEREMINHOP is a parameter indicating the remaining time duration of this hop. A remote station will use this information to determine when to switch to the next carrier frequency of the hop pattern. FRAMELENGTH is a parameter indicating the length of the frame. This information is used by remote stations to determine when to expect the AH header information in a sequence of frames. F(1), . . . , F(N) are the next N hopping frequencies. The list of N frequencies are received and used by remote stations for the following purposes:

The list of frequencies is used by a remote to build up and conform to the specified hopping pattern.

The list will be used by a remote to update its hopping pattern. The remote needs to keep track of pattern changes whenever the base station uses a dynamic hop revision policy for combating interference in the cell.

The value of N, a system design parameter, is chosen such that the remote station can maintain synchronism with a high degree of reliability. Assuming N=4 and Header AH error rate is less than 1 percent, the probability of loss of all 4 consecutive headers will be less than $10^{-8}$.

Figure 5:
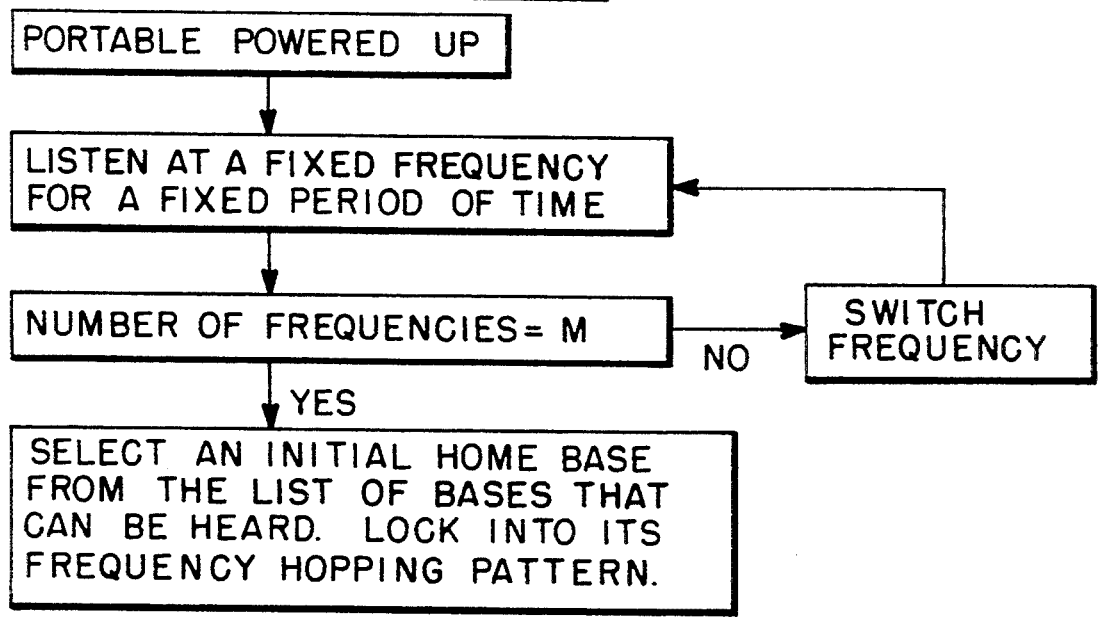
FIG. 5 is an illustration of a flow chart of steps employed in the monitoring and selection phases of the synchronization technique of the present invention.

Referring to FIG. 5, the initial pattern acquisition steps are shown. When a remote is first turned on, it does not know who are the surrounding bases and what frequency hopping patterns they have. However, it is assumed that it knows both the hop length and the superframe length. A remote depends on executing the algorithm shown in FIG. 5 in selecting its home base. When a remote is first powered up, it listens at a fixed frequency and searches for valid header messages from neighboring bases. The indicators such as RSSI (received signal strength indication), HOR (header observation rate), and LF (load factor) can be monitored. After a fixed period of time which is equal to the length of a superframe, it switches to another frequency and keeps on monitoring. During this monitoring process, the remote keeps records on RSSI, HOR, and LF from each base. A number (M) of frequencies are examined before a remote chooses an initial home base because the remote should depend on average RSSI observed at several frequencies to eliminate the effect of frequency dependent fading. Besides, HOR and LF are parameters which are more meaningful when they are calculated by averaging the results of several monitoring cycles.

In selecting an initial home base, different emphasis can be placed on the selection criteria, RSSI, HOR, or LF. Methods for selecting an initial home base based on multiple selection criteria are known in the art. After a fixed number of (e.g., M=5) frequencies have been examined and an initial home base is selected, the remote locks into the frequency hopping pattern of its chosen home base.

Figure 6:
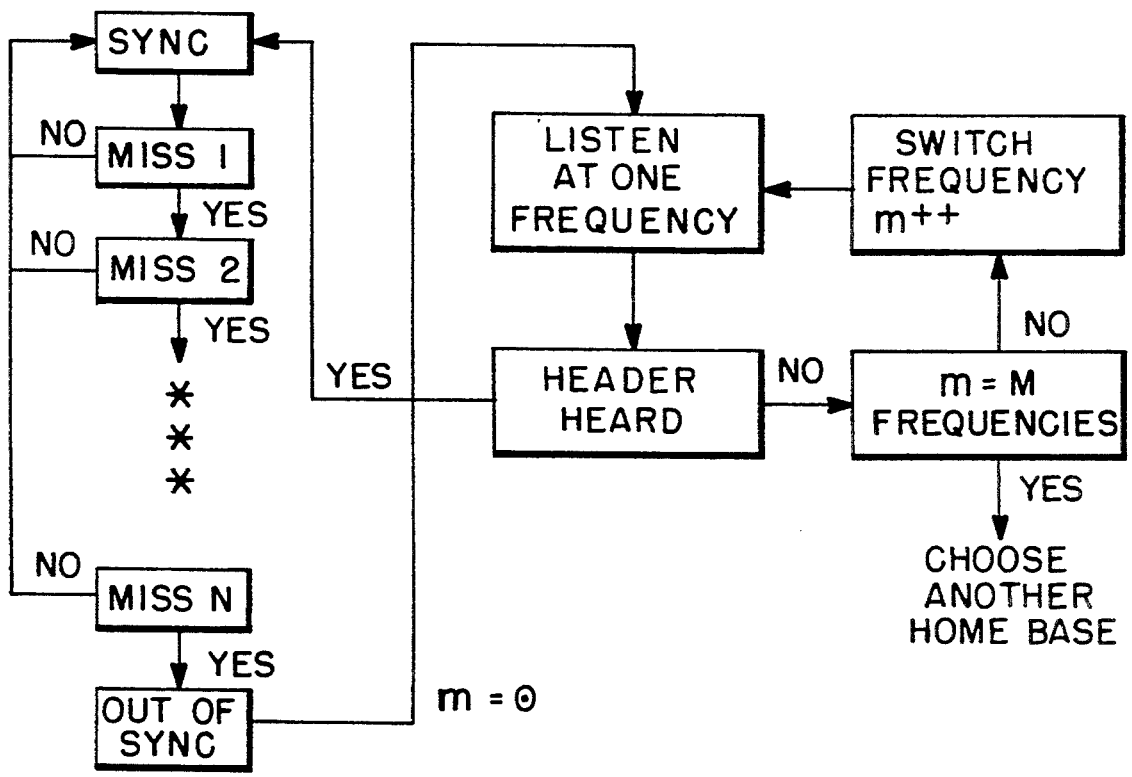
FIG. 6 is an illustration of a flow chart of steps employed in the tracking phase of the synchronization technique of the present invention.

After a remote initially acquires the frequency hopping sequence from its home base, it enters into a hopping pattern tracking phase. In this phase, the flow chart illustrated in FIG. 6 is executed.

The remote is in a "SYNC" state after it acquires the frequency hopping sequence. At that point, the remote tries to look for the header message in the following frequency hop. If it finds it, it stays in the "SYNC" state. Otherwise, it enters the "MISS 1" state. At this point, it tries to look for a header again in the next frequency hop. If it finds it, it returns to the "SYNC" state. Otherwise, it enters the "MISS 2" state. This procedure of header hunting continues until N header in a sequence are missing. In this situation, the remote enters an "OUT OF SYNC" state.

At the "OUT OF SYNC" state, the remote switches to a certain frequency for a prolonged period of time (at least the length of a superframe) and monitors the header transmissions from all the neighboring bases. If it finds the header from its home base, it gets back to the "SYNC" state again. Otherwise, it switches to another frequency and monitors the headers. This process of header monitoring ends when after monitoring M frequencies the remote does not find a header from its home base. At this point, the remote chooses another home base and locks into its frequency hopping pattern.

Figure 7:
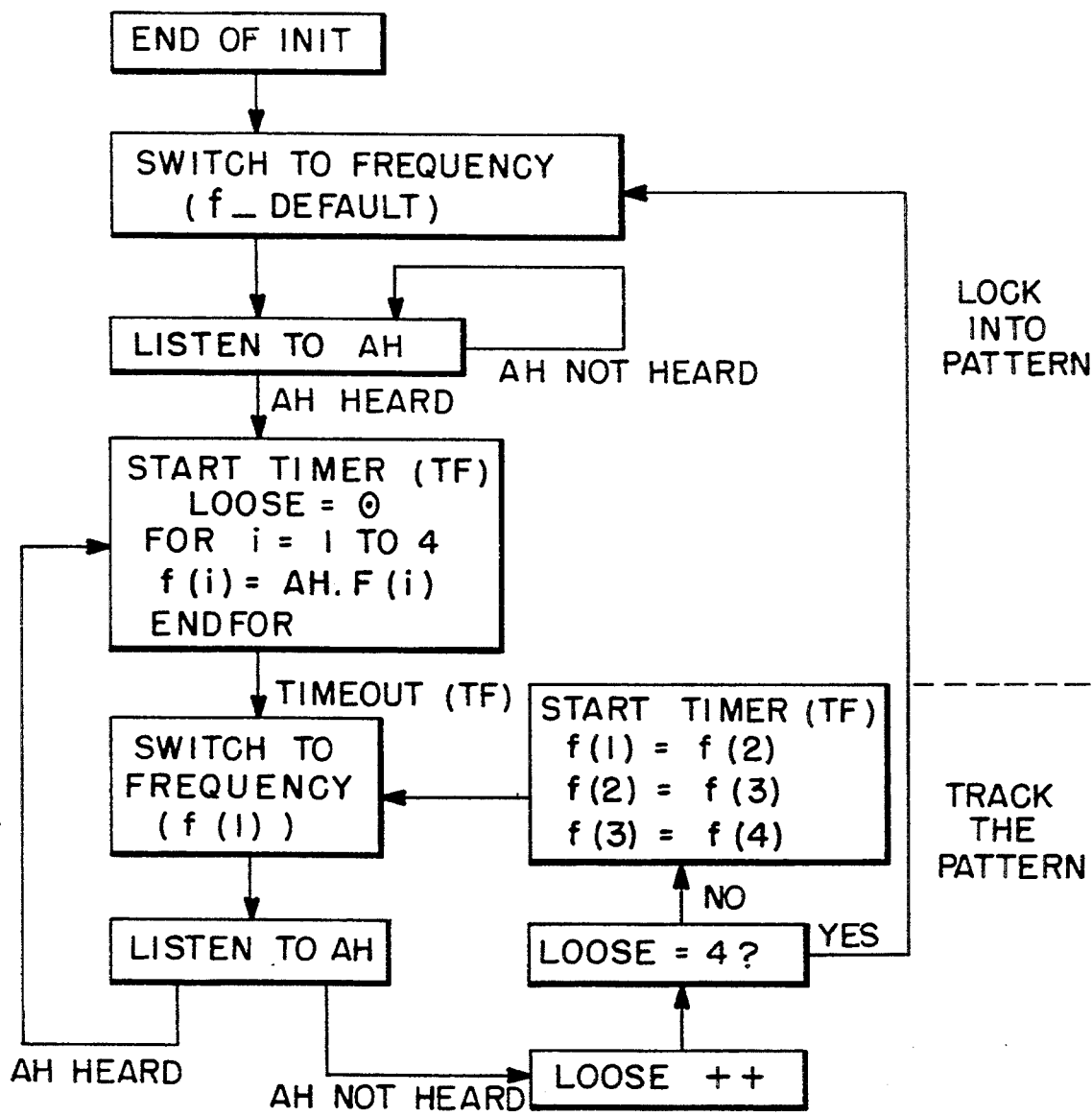
FIG. 7 is a flow chart of the steps employed for locking into a hopping pattern and tracking the hopping pattern in a synchronization technique according to the present invention.

The method described above enables a remote station to keep track of its hopping pattern and maintain fault-tolerant F synchronization if more than 4 consecutive frames are missed. The logic is summarized in the flowchart shown in FIG. 7. In the flowchart, AH.F (1), AH.F (2), AH.F (3) and AH.F (4) correspond to the four frequencies indicated in each AH header. TF is the duration of a frame (=hop length/number of frames per hop). The four RAM positions f(1), f(2), f(3) and f(4) are defined to give the next four frequencies to be used after the current frequency.

Figure 8:
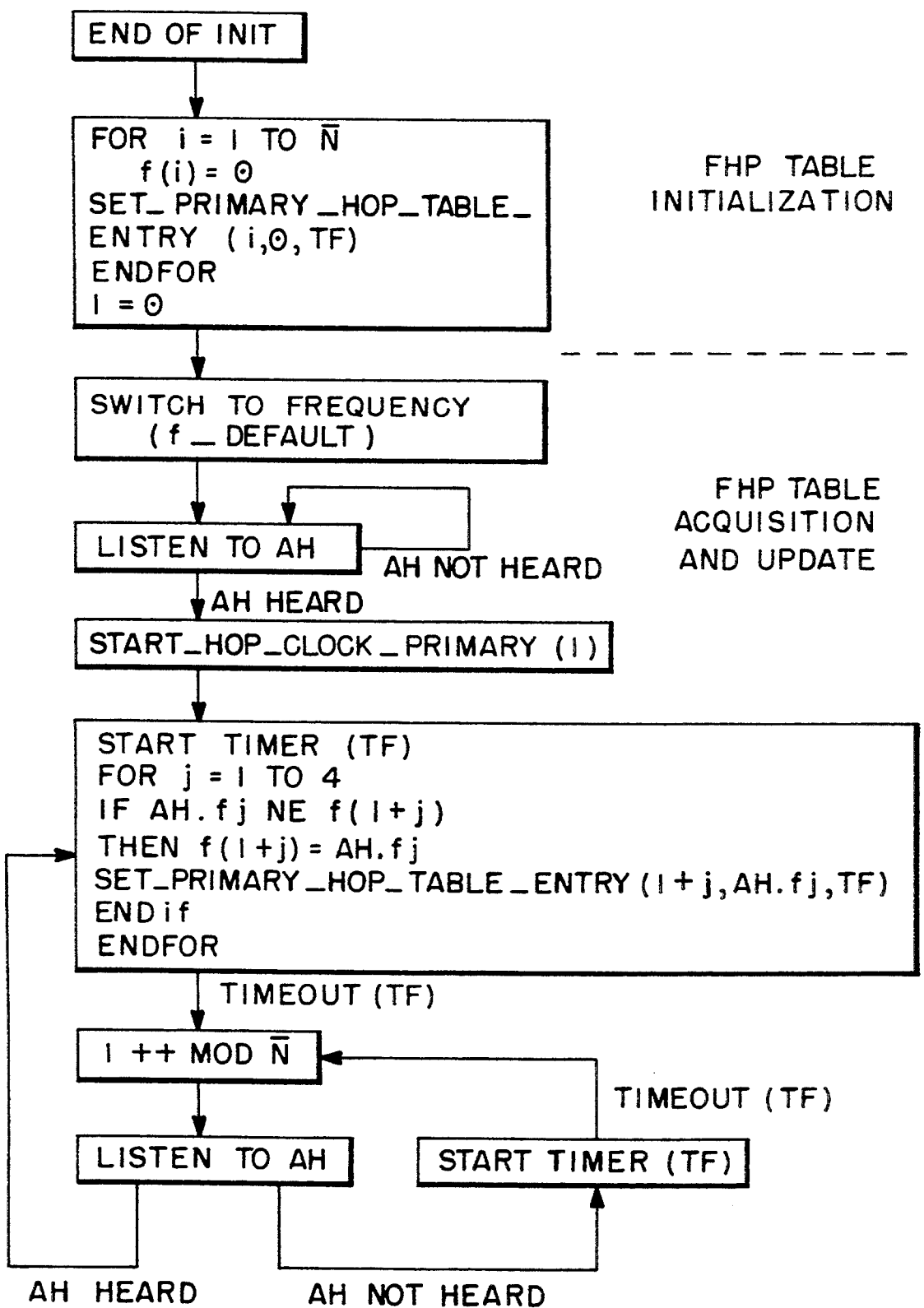
FIG. 8 is an illustration of a flow chart for a memory table based approach for maintaining frequency hopping synchronization according to the principles of the present invention.

A fault tolerant frequency hopping synchronization based on a memory table based approach will next be discussed. The main idea of this approach is to learn the frequency hopping pattern, memorize it and update it if necessary, using the steps illustrated in FIG. 8. Then if successive frequencies are missed, then the memorized table is used. Suppose N corresponds to the number of frequencies in the frequency hopping pattern. Let N RAM positions f(1), f(2), ..., f(N) give the sequence of frequencies in the FHP. The RF modem maintains a hop table. The modem first listens at a default frequency, fdefault. The hop table is maintained current by updating it based on the F pattern information in Header AH. Dynamic changes to the hopping pattern are conveyed by the base station in every header and used by remote stations to update their F table. The only case where this scheme fails corresponds to the situation where a frequency is changed just after a sequence of four consecutive missed frequencies. Nevertheless, if the following frequency matches with the memorized one, then the synchronization is ensured again. Hence, the scheme is very robust.

Figure 9:
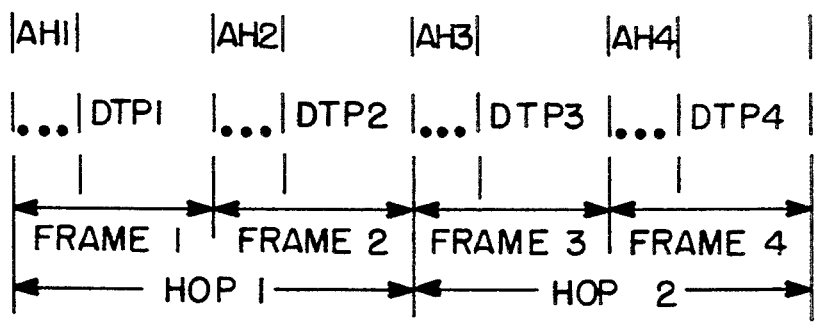
FIG. 9 is an illustration of a frequency hop with multiple frames.

If a frequency hop contains more than one frame as shown in FIG. 9, then the implementation can be generalized in a straightforward manner to achieve hop synchronization described above.

What has been described is a method for periodic broadcasting of Frequency Hopping control information from a base station to a set of remote stations that wish to hop in synchronism with the base station. The method also provide for the acquisition o Frequency Hopping information by a newly arrived remote station (i.e., one that has been just turned ON) and for reliable and continuous tracking of the Frequency Hopping information even when the broadcast control header messages from the base station may intermittently be lost due to poor propagation conditions.

While the invention has been described in connection with a preferred embodiment, it is not intended to limit the scope of the invention to the particular form set forth, but, on the contrary, it is intended to cover such alternatives, modifications, and equivalence as may be included within the spirit and scope of the invention as defined in the appended claims.

What is claimed is:

1. In a multicellular communications network system comprising base stations having different addresses and a plurality of remote stations incorporating a technique for frequency hopping wherein said base stations transmit information to remote stations using a sequence of frequency hops of different carrier frequencies, a method for generating and transmitting consecutive frames of data for synchronization during said transmission comprising the steps of:

Step 1 generating frames of data to be transmitted from each of said base station to said remote stations, said frames including a header portion and a data transfer portion, Step 2 incorporating frequency hopping control information into said frame header portion by incorporating the address of said base station within the network, incorporating the time remaining in said frequency hop being used, incorporating the frame length of said frame and incorporating a list of the next hopping frequencies to be used in said sequence of changing frequency hopping sequence tracking technique, wherein said remote station switches to a given frequency for a given period of time equal to or greater than the length of a frame, and wherein said remote station monitors the header information of frames transmitted from a series of other bases of said network and selects another base as a new home base when paid SYNC state of operation is not achieved with a selected number of attempts, Step 3 transmitting a plurality of said frames from said base stations to said remote stations using a sequence of frequency hops having different carrier frequencies.

2. A method according to claim 1 further including a step 4 wherein a remote station performs a technique for acquiring said plurality of frames transmitted from said base station in Step 3 by listening to frames of information transmitted from different bases by repeatedly listening to different frequencies for fixed periods of time equal to a frame length, and selecting a home base from said different bases listened to by locking into the frequency hopping sequence of said selected base.

3. A method according to claim 2 wherein said remote station monitors and records indicators from said transmitted frames from said different bases, said indicators being the received signal strength indication (RSSI), the header observation rate (HOR) and the load factor (LF) from said different bases, and wherein said selected home base is selected in accordance with said indicator criteria.

4. A method according to claim 3 including a synchronization technique wherein, after selecting a home base in said acquiring step of claim 3, said method performs a frequency hopping sequence tracking technique, said frequency hopping sequence tracking technique including the steps of acquiring the said frequency hopping sequence including the next frequency hop, seeking the header information in the next frequency hop transmitted by said selected home base, upon finding the header information said remote station enters a SYNC state of operation, upon not finding the header information after seeking for a predetermined number of frequency hops, said remote station enters an OUT OF SYNC state of operation.

5. A method according to claim 4 wherein, when said remote station is in said OUT OF SYNC state in said frequency hopping sequence tracking technique, said remote station switches to a given frequency for a given period of time equal to or greater than the length of a frame, and wherein said remote station monitors the header information of frames transmitted from a series of other bases of said network and selects another base as a new home base when paid SYNC state of operation is not achieved with a selected number of attempts.

6. A method according to claim 5 further including a technique for fault tolerant frequency hopping synchronization wherein a frequency hop table is initialized and stored in a memory table by storing the separate frequencies in the said frequency hop sequence, listening at said remote station for a specific frequency referred to as a default frequency updating said memory table based on changes in the frequency hop sequence data in said frame headers transmitted from said base stations.

* * * * *